US012597143B2

(12) United States Patent
Arbelo-Gonzalez et al.

(10) Patent No.: US 12,597,143 B2
(45) Date of Patent: Apr. 7, 2026

(54) SEMANTIC SEGMENTATION OF SPARSE MULTI-DIMENSIONAL TENSORS

(71) Applicant: Altos Labs, Inc., Redwood City, CA (US)

(72) Inventors: Wilmer Arbelo-Gonzalez, Berkeley, CA (US); Adam Scott Frost, San Francisco, CA (US); Valentina Pedoia, San Francisco, CA (US)

(73) Assignee: Altos Labs, Inc., Redwood City, CA (US)

( * ) Notice: Subject to any disclaimer, the term of this patent is extended or adjusted under 35 U.S.C. 154(b) by 457 days.

(21) Appl. No.: 18/170,912

(22) Filed: Feb. 17, 2023

(65) Prior Publication Data

US 2024/0281981 A1     Aug. 22, 2024

(51) Int. Cl.
| | |
|---|---|
| *G06T 7/11* | (2017.01) |
| *G06T 3/40* | (2006.01) |
| *G06T 3/60* | (2006.01) |
| *G06T 7/12* | (2017.01) |
| *G06T 15/00* | (2011.01) |
| *G06V 10/764* | (2022.01) |
| *G06V 10/82* | (2022.01) |

(52) U.S. Cl.
CPC ................. *G06T 7/12* (2017.01); *G06T 3/40* (2013.01); *G06T 3/60* (2013.01); *G06T 15/00* (2013.01); *G06V 10/764* (2022.01); *G06T 2207/20081* (2013.01)

(58) Field of Classification Search
CPC .... G06T 7/12; G06T 3/40; G06T 3/60; G06T 15/00; G06T 2207/20081; G06T 2207/10061; G06T 2207/20084; G06T 7/11; G06V 10/764; G06V 10/82
See application file for complete search history.

(56) References Cited

U.S. PATENT DOCUMENTS

| | | | |
|---|---|---|---|
| 2020/0103247 A1 | 4/2020 | Yu et al. | |
| 2021/0401392 A1* | 12/2021 | Bengtsson | ........... A61B 6/5235 |
| 2023/0035475 A1 | 2/2023 | Cheng et al. | |

FOREIGN PATENT DOCUMENTS

WO          2022/133190 A1     6/2022

OTHER PUBLICATIONS

Passino, Pyramidal Model for Image Semantic Segmentation, 2010 International Conference on Pattern Recognition (Year: 2010).*

(Continued)

*Primary Examiner* — Vu Le
*Assistant Examiner* — Lei Zhao
(74) *Attorney, Agent, or Firm* — Squire Patton Boggs LLP; Sarah Mirza

(57) ABSTRACT

One embodiment of the present invention sets forth a technique for training a machine learning model to perform semantic segmentation. The technique includes iteratively extracting, from a set of 3D images, a first set of three-dimensional (3D) patches having a first patch size and a second set of 3D patches having a second patch size, where the second patch size is smaller than the first patch size. The technique also includes training the machine learning model using the first set of 3D patches and a first set of losses associated with the first set of 3D patches. The technique further includes training the machine learning model using the second set of 3D patches and a second set of losses associated with the second set of 3D patches.

21 Claims, 4 Drawing Sheets

(56) References Cited

OTHER PUBLICATIONS

Shrivastava, Handling Class Imbalance byIntroducing Sample Weighting inthe Loss Function, GumGum Tech Blog, https://medium.com/gumgum-tech/handling-class-imbalance-by-introducing-sample-weighting-in-the-loss-function-3bdebd8203b4, Dec. 16, 2020 (Year: 2020).*

Gallusser, Deep neural network automated segmentation of cellular structures in vol. electron microscopy, J. Cell Biol. 2023 vol. 222 No. 2, published on: Dec. 5, 2022 (Year: 2022).*

Gubins et al., "SHREC 2021: Classification in Cryo-Electron Tomograms", arXiv:2203.10035, Mar. 18, 2022, 16 pages.

Fung et al., "Genetically encoded multimeric tags for intracellular protein localisation in cryo-EM", DOI: https://doi.org/10.1101/2022.12.10.519870, Dec. 10, 2022, 29 pages.

Gallusser et al., "Deep neural network automated segmentation of cellular structures in vol. electron microscopy", DOI: https://doi.org/10.1101/2022.08.02.502534, Oct. 12, 2022, 96 pages.

Speier et al., "Image-based patch selection for deep learning to improve automated Gleason grading in histopathological slides", DOI: https://doi.org/10.1101/2020.09.26.314989, Sep. 26, 2020, 8 pages.

Passino et al., "Pyramidal Model for Image Semantic Segmentation", 2010 International Conference on Pattern Recognition, ICPR 2010, DOI:10.1109/ICPR.2010.384, 2010, pp. 1554-1557.

Liu et al., "Efficient Patch-Wise Semantic Segmentation for Large-Scale Remote Sensing Images", Sensors 2018, vol. 18, DOI:10.3390/s18103232, Sep. 25, 2018, pp. 1-16.

International Search Report for Application No. PCT/US2024/16303 dated May 31, 2024.

International Preliminary Report on Patentability received for Application No. PCT/US2024/016303 dated Aug. 28, 2025, 9 pages.

* cited by examiner

SEMANTIC SEGMENTATION OF SPARSE MULTI-DIMENSIONAL TENSORS

BACKGROUND

Field of the Various Embodiments

Embodiments of the present disclosure relate generally to machine learning, semantic segmentation, and, more specifically, to semantic segmentation of sparse multi-dimensional tensors.

Description of the Related Art

Many scientific imaging techniques record the radiation scattered by sparse objects of interest embedded from unknown locations within a complex environment. One such technique is Cryoelectron tomography (CryoET), a projection imaging technique that can generate near-atomic resolution and three-dimensional (3D) views of biological samples such as molecules, cells, tissues, and organisms. In CryoET, a biological sample is vitrified and imaged in a transmission electron microscope (TEM) through a range of tilt angles. This "tilt series" of 2D projections can then be computationally reconstructed into a 3D image of the sample.

CryoET tomograms tend to record a diverse set of small and sparse objects of interest within large volumes of data. Accordingly, CryoET tomograms are difficult to process or analyze using conventional machine learning or computer vision techniques. Specifically, CryoET tomograms are often too large to be stored in memory and processed as a single input by a machine learning model. Further, biological membranes, proteins, nucleic acids, and other cellular objects of interest tend to be very sparsely distributed within a CryoET tomogram. Each object of interest is typically on the order of 10 nanometers (nm) in size. At the same time, biological samples are sensitive to the radiation damaged caused by the electron beam, which limits the dose that can be tolerated by the biological samples and, in turn, severely limits the spectral-signal-to-noise ratio (SSNR) of CryoET tomograms. The low-dose imaging conditions and poor SSNR prevents CryoET tomograms from capturing the fine structural details that distinguish objects of interest from one another. Consequently, it can be difficult to train a machine learning model to learn to recognize these small and sparsely distributed objects against a noisy background.

As the foregoing illustrates, what is needed in the art are more effective techniques for analyzing CryoET tomograms using machine learning models.

SUMMARY

One embodiment of the present invention sets forth a technique for training a machine learning model to perform semantic segmentation. The technique includes extracting, from a set of 3D images, a first set of three-dimensional (3D) patches having a first patch size and a second set of 3D patches having a second patch size, where the second patch size is smaller than the first patch size. The technique also includes training the machine learning model using the first set of 3D patches and a first set of losses associated with the first set of 3D patches. The technique further includes training the machine learning model using the second set of 3D patches and a second set of losses associated with the second set of 3D patches.

One technical advantage of the disclosed techniques relative to the prior art is that, by training and executing the machine learning model using 3D patches extracted from larger 3D images, the disclosed techniques adapt the 3D semantic segmentation task to available memory and computational resources. Another technical advantage of the disclosed techniques is that, by varying the size of the 3D patches and class weights used to train the machine learning model, the disclosed techniques increase the granularity and precision with which the machine learning model recognizes and locates objects of variable size in the 3D patches. These technical advantages provide one or more technological improvements over prior art approaches.

BRIEF DESCRIPTION OF THE DRAWINGS

So that the way the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
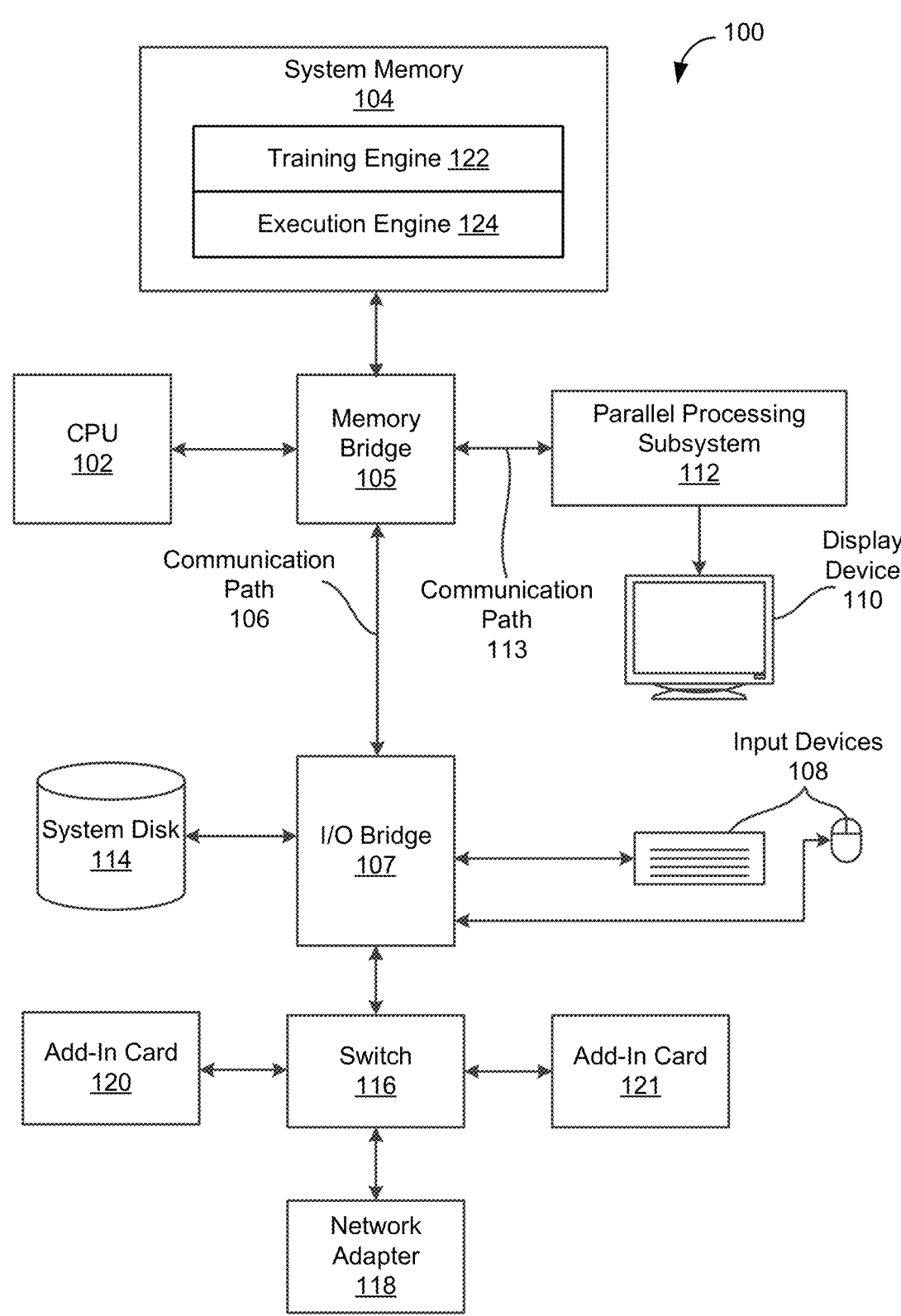
FIG. 1 illustrates a computer system configured to implement one or more aspects of various embodiments.

In the following description, numerous specific details are set forth to provide a more thorough understanding of the various embodiments. However, it will be apparent to one of skill in the art that the inventive concepts may be practiced without one or more of these specific details.

As discussed above, CryoET tomograms are often too large to be stored in memory and processed as a single input by a machine learning model. Further, membranes, proteins, particles, and other objects of interest tend to be very sparsely distributed within a CryoET tomogram and are typically small by comparison with the imaged volume. As a result, CryoET tomograms can be difficult to process or analyze using conventional machine learning or computer vision techniques.

To improve the processing of CryoET tomograms and other types of three-dimensional (3D) images (also referred to herein as 3D volumes) including small and sparsely distributed objects of interest, the disclosed techniques divide each 3D image into multiple 3D patches and provide each 3D patch as a separate input into a machine learning model. The machine learning model converts each inputted 3D patch into a corresponding semantic segmentation. For example, the machine learning model could generate predictions of classes representing different proteins, organelle membranes, cell structures, particles, or other objects of interest for individual pixels, voxels, or 3D locations in a given 3D patch extracted from a CryoET tomogram.

During training, the size of the 3D patches is dynamically and iteratively varied based on the performance of the machine learning model. For example, the machine learning model could initially be trained using 3D patches of a certain size. As training of the machine learning model progresses, the performance of the machine learning model could be determined using a loss function and/or one or more metrics. When the performance of the machine learning model meets a threshold and/or a set of conditions, the size of the 3D patches is reduced. This process is repeated to gradually decrease the size of the 3D patches used to train the machine learning model over time, thereby allowing the machine learning model to learn to recognize objects in the 3D patches with increasing granularity and precision.

The loss function used to train the machine learning model can also be varied dynamically based on the relationship between patch size and the balance between "foreground" classes that represent objects and a "background" class for the medium or environment in which the objects are found. More specifically, the loss function includes different weights for different classes of objects with which training data for the machine learning model is labeled. The weights are initially computed to be inversely proportional to the relative frequencies of the classes in the training data, so that the most frequent class is associated with the lowest weight and the least frequent class is associated with the highest weight. These initial weights correct for the bias of the machine learning model toward more frequent classes in the training data. As training of the machine learning model progresses, the higher weights are gradually adjusted to be closer to one another over time to improve the overall performance of the machine learning model.

The disclosed techniques can also be adapted to train and execute machine learning models to perform various tasks associated with different types of data. For example, the disclosed techniques could be used to train and execute machine learning models that process N-dimensional images, volumes, or other types of data (for positive integer values of N). The disclosed techniques could also, or instead, be used to train and execute machine learning models to perform classification, object detection, semantic segmentation, instance segmentation, image editing, pose estimation, object tracking, or other tasks related to N-dimensional images, volumes, or other types of data (for positive integer values of N).

System Overview

FIG. 1 is a block diagram illustrating a computer system 100 configured to implement one or more aspects of various embodiments. In one embodiment, computer system 100 includes a desktop computer, a laptop computer, a smart phone, a personal digital assistant (PDA), tablet computer, or any other type of computing device configured to receive input, process data, and optionally display images, and is suitable for practicing one or more embodiments. Computer system 100 also, or instead, includes a machine or processing node operating in a data center, cluster, or cloud computing environment that provides scalable computing resources (optionally as a service) over a network.

As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/ output) bridge 107 via a communication path 106, and I/O bridge 107 is, in turn, coupled to a switch 116.

I/O bridge 107 is configured to receive user input information from optional input devices 108, such as a keyboard or a mouse, and forward the input information to CPU 102 for processing via communication path 106 and memory bridge 105. In some embodiments, computer system 100 may be a server machine in a cloud computing environment. In such embodiments, computer system 100 may not have input devices 108. Instead, computer system 100 may receive equivalent input information by receiving commands in the form of messages transmitted over a network and received via the network adapter 118. In one embodiment, switch 116 is configured to provide connections between I/O bridge 107 and other components of the computer system 100, such as a network adapter 118 and various add-in cards 120 and 121.

In one embodiment, I/O bridge 107 is coupled to a system disk 114 that may be configured to store content and applications and data for use by CPU 102 and parallel processing subsystem 112. In one embodiment, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. In various embodiments, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 includes a graphics subsystem that delivers pixels to an optional display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. Such circuitry may be incorporated across one or more parallel processing units (PPUs), also referred to herein as parallel processors, included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver configured to manage the processing operations of the one or more PPUs within parallel processing subsystem 112.

Parallel processing subsystem 112 may be integrated with one or more of the other elements of FIG. 1 to form a single system. For example, parallel processing subsystem 112 may be integrated with CPU 102 and other connection circuitry on a single chip to form a system on chip (SoC).

In one embodiment, CPU 102 is the master processor of computer system 100, controlling and coordinating operations of other system components. In one embodiment, CPU 102 issues commands that control the operation of PPUs. In some embodiments, communication path 113 is a PCI Express link, in which dedicated lanes are allocated to each PPU, as is known in the art. Other communication paths may also be used. PPU advantageously implements a highly parallel processing architecture. A PPU may be provided with any amount of local parallel processing memory (PP memory).

It will be appreciated that the system shown herein is illustrative and that variations and modifications are possible. First, the functionality of the system can be distributed across multiple nodes of a distributed and/or cloud computing system. Second, the connection topology, including the number and arrangement of bridges, the number of CPUs 102, and the number of parallel processing subsystems 112, can be modified as desired. For example, in some embodiments, system memory 104 could be connected to CPU 102 directly rather than through memory bridge 105, and other devices would communicate with system memory 104 via memory bridge 105 and CPU 102. In another example, parallel processing subsystem 112 may be connected to I/O bridge 107 or directly to CPU 102, rather than to memory bridge 105. In a third example, I/O bridge 107 and memory bridge 105 may be integrated into a single chip instead of existing as one or more discrete devices. Third one or more components shown in FIG. 1 may not be present. For example, switch 116 could be eliminated, and network adapter 118 and add-in cards 120, 121 would connect directly to I/O bridge 107.

In one or more embodiments, computer system 100 is configured to execute a training engine 122 and an execution engine 124 that reside in system memory 104. Training engine 122 and execution engine 124 may be stored in system disk 114 and/or other storage and loaded into system memory 104 when executed.

More specifically, training engine 122 and execution engine 124 include functionality to train and execute a machine learning model to perform semantic segmentation of sparse 3D images (also referred to herein as 3D volumes). Each 3D image is divided into multiple 3D patches, and each 3D patch is provided as a separate input into the machine learning model. To improve the semantic segmentation performance of the machine learning model, training engine 122 dynamically varies the sizes of the 3D patches and weights associated with class labels in training data for the machine learning model during training of the machine learning model. After training of the machine learning model is complete, execution engine 124 uses the trained machine learning model to generate predictions of the class labels for 3D patches extracted from additional 3D images. The operation of training engine 122 and execution engine 124 is described in further detail below.

Semantic Segmentation of Sparse 3D Volumes

Figure 2:
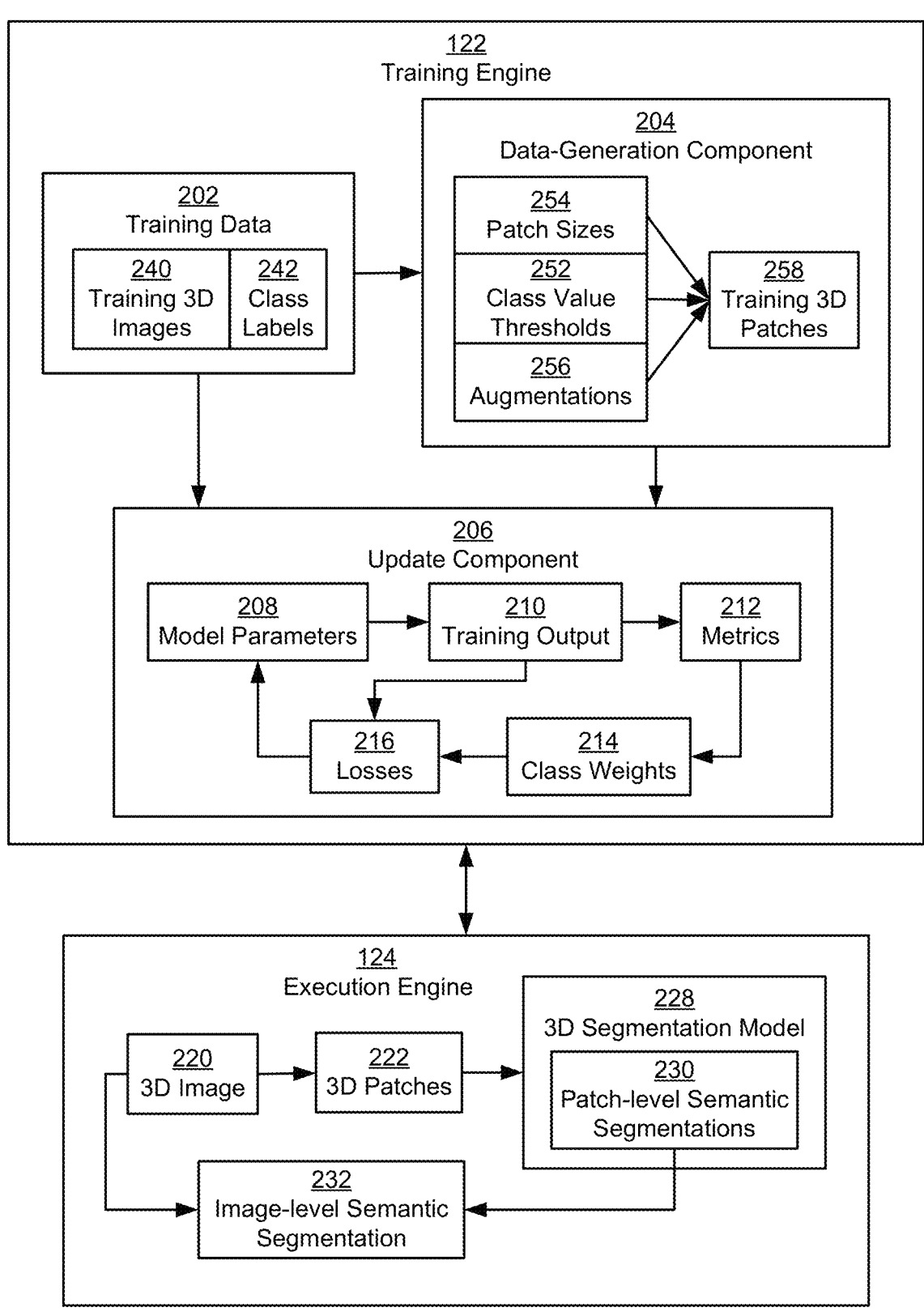
FIG. 2 is a more detailed illustration of the training engine and execution engine of FIG. 1, according to various embodiments.

FIG. 2 is a more detailed illustration of training engine 122 and execution engine 124 of FIG. 1, according to various embodiments. As mentioned above, training engine 122 and execution engine 124 operate to train and execute a 3D segmentation model 228 to perform a 3D semantic segmentation task. For example, training engine 122 and execution engine 124 could train and execute 3D segmentation model 228 to detect different types of particles or structures within a 3D image 220 that depicts a biological, cellular, or another type of environment.

In one or more embodiments, 3D image 220 includes a tomogram that is generated using cryoelectron tomography (CryoET). For example, 3D image 220 could include a 3D view of a biological sample that includes one or more macromolecules, cells, tissues, or organisms. The biological sample could be flash frozen and imaged in a transmission electron microscope (TEM). The biological sample could also be tilted to different angles relative to the electron beam of the TEM to acquire a two-dimensional (2D) image at each angle. This "tilt series" of 2D images could then be computationally reconstructed into a 3D image of the sample. This 3D depiction could include relatively small and/or sparse representations of membranes, proteins, particles, and other objects of interest against a noisy background.

3D image 220 can also, or instead, include depictions of other environments with small or sparse objects of interest. For example, 3D image 220 could include depictions of cells, proteins, nucleic acids, or other objects that have been labeled to enhance the visibility or visualization of these objects against a background. In another example, 3D image 220 could include a 3D representation of an object that is captured using a computed tomograph (CT), magnetic resonance imaging (MRI), ultrasound, or another type of scan. In a third example, 3D image 220 could include a point cloud, a 3D "data cube" of astronomical data, or another 3D representation of a physical space.

In some embodiments, 3D segmentation model 228 includes a fully convolutional neural network that is capable of processing inputs of varying resolutions. For example, 3D segmentation model 228 could include a U-Net architecture that includes an encoder and a decoder. The encoder could include convolutional layers and max pooling layers that generate downsampled feature maps from a given 3D image 220 and/or one or more subsets of that 3D image 220. The decoder could use upsampling, concatenation, and transpose convolution operations to generate upsampled feature maps from the downsampled feature maps. The U-Net architecture could also include skip connections that connect various layers of the encoder with corresponding layers of decoder associated with the same feature map resolution.

In another example, 3D segmentation model 228 could include a V-Net architecture. Like the U-Net, the V-Net also includes an encoder that generates downsampled feature maps from a given 3D image 220 and/or 3D patches 222 from that 3D image 220, a decoder that generates upsampled feature maps from the downsampled feature maps, and skip connections that connect various layers of the encoder with corresponding layers of decoder associated with the same feature map resolution. The encoder of the V-Net uses strided convolutions to perform learned downsampling of the feature maps, and the decoder of the V-Net uses deconvolution operations to perform upsampling of the feature maps. In various embodiments, each resolution at which the V-Net operates includes a residual function that performs nonlinear processing of the input into that resolution and adds the result to the output of the last layer associated with that resolution.

As mentioned above, 3D image 220 can be divided into smaller 3D patches 222, and each 3D patch can be provided as a separate input into 3D segmentation model 228. Each of 3D patches 222 extracted from 3D image 220 includes a contiguous region or subsection within 3D image 220 of a certain height, width, and depth. For example, each of 3D patches 222 could include a cube-shaped region with the same height, width, and depth that is retrieved from a particular location in 3D image 220. In another example, 3D patches 222 could include different regions of varying heights, widths, and depths within 3D image 220.

Figure 3A:
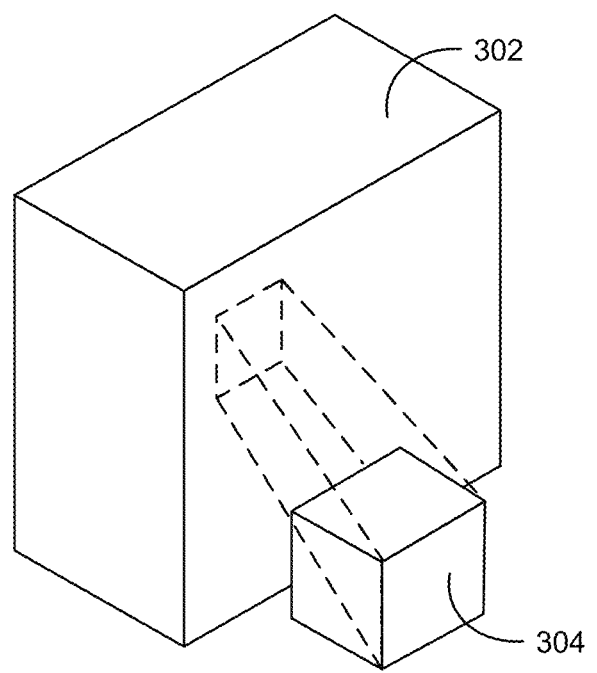
FIG. 3A illustrates the extraction of a three-dimensional (3D) patch from a 3D image, according to various embodiments.

FIG. 3A illustrates the extraction of a 3D patch 304 from a 3D image 302, according to various embodiments. As shown in FIG. 3A, 3D image 302 corresponds to a 3D volume with a certain width, height, and depth, and 3D patch 304 includes a smaller cube-shaped region within 3D image 302.

3D patch 304 can be extracted from 3D image 302 in a variety of ways. For example, 3D image 302 could be divided into multiple contiguous 3D patches (including 3D patch 304) of fixed size. In another example, multiple 3D patches (including 3D patch 304) of the same size could be extracted from 3D image 302 via a sliding window or stride of a different size. In a third example, 3D patch 304 could be extracted from a random position or location within 3D image 302.

Returning to the discussion of FIG. 2, training engine 122 trains 3D segmentation model 228 using training data 202 that includes a set of training 3D images 240 and a corresponding set of class labels 242. Training 3D images 240 include 3D depictions of environments that are relevant to the semantic segmentation task to be performed by 3D segmentation model 228. For example, training 3D images 240 could include real or synthetic tomograms, point clouds, astronomical data, or other types of 3D volumes.

Class labels 242 include locations of objects of interest within training 3D images 240. For example, a set of class labels 242 for a given training 3D image could include the same dimensions as that training 3D image. Each class label could be associated with a corresponding 3D location (e.g., voxel, 3D point, etc.) in the training 3D image and indicate the type of object (e.g., a specific type of protein, membrane, particle, etc.) found at that 3D location.

A data-generation component 204 in training engine 122 generates one or more sets of training 3D patches 258 from training 3D images 240. As shown in FIG. 2, data-generation component 204 uses various criteria to generate training 3D patches 258 from training 3D images 240. These criteria include patch sizes 254 associated with training 3D patches 258, class value thresholds 252 associated with class labels 242 for training 3D patches 258, and augmentations 256 applied to training 3D patches 258.

Patch sizes 254 include dimensions of training 3D patches 258. For example, patch sizes 254 could specify lengths, widths, and heights of various regions within training 3D images 240 that are extracted as training 3D patches 258. These patch sizes 254 could be used to extract training 3D patches 258 from random locations in training 3D images 240, divide each training 3D image 240 into contiguous training 3D patches 258, extract overlapping training 3D patches 258 from training 3D images 240 (e.g., using sliding windows), and/or otherwise generate training 3D patches 258 from training 3D images 240.

In one or more embodiments, data-generation component 204 generates training 3D patches 258 of varying patch sizes 254 from training 3D images 240. For example, data-generation component 204 could extract cube-shaped training 3D patches 258 of X different patch sizes 254 from training 3D images 240. The value of X and the specific patch sizes 254 could be specified by a user, determined via one or more heuristics, selected to be proportional to and/or based on the sizes of objects or features within training 3D images 240, and/or determined via one or more optimization operations, as described in further detail below.

Class value thresholds 252 are used to ensure that each of training 3D patches 258 includes a minimum amount of "signal" associated with class labels 242 for objects of interest in training 3D images 240. For example, class value thresholds 252 may include a minimum threshold for the number or proportion of voxels, 3D points, or other 3D locations in a given training 3D patch that are assigned to a single class label that is not a "background" or "unknown" label. In another example, class value thresholds 252 may include a minimum threshold for the number or proportion of voxels, 3D points, or other 3D locations in a given training 3D patch that are assigned to any class label that is not "background" or "unknown." In both examples, a training 3D patch that does not meet the minimum threshold is discarded instead of being used to train 3D segmentation model 228.

Augmentations 256 include various transformations that are applied to training 3D patches 258 that meet class value thresholds 252 to generate additional training 3D patches 258. For example, augmentations 256 could include (but are not limited to) random rotations, translations, scalings, shearings, histogram shifts, additions of noise, and/or elastic deformations of training 3D patches 258. When a given set of augmentations 256 causes the positions of objects in a training 3D patch to change, data-generation component 204 applies the same set of augmentations 256 to class labels 242 for the training 3D patch to generate a new set of class labels 242 for the new object positions.

Figure 3B:
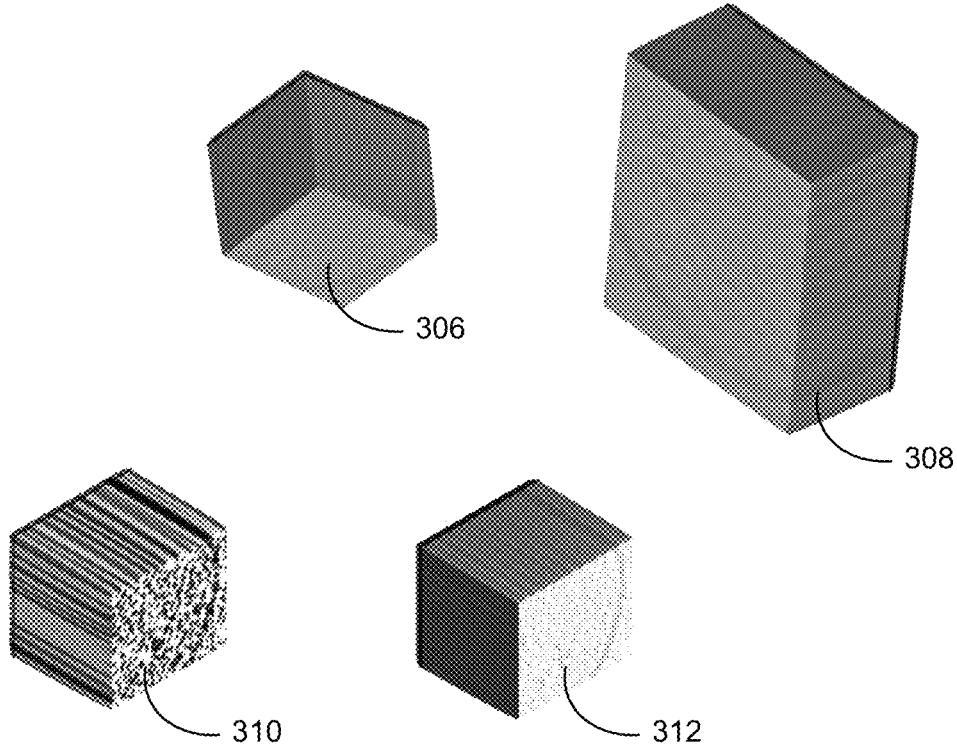
FIG. 3B illustrates an example set of 3D patches that are produced by augmenting an original 3D patch, according to various embodiments.

FIG. 3B illustrates an example set of 3D patches 306-312 that are produced by augmenting an original 3D patch (e.g., 3D patch 304 of FIG. 3A), according to various embodiments. 3D patch 306 can be generated by applying a random rotation to the original 3D patch. 3D patch 308 can be generated by randomly scaling one or more dimensions of the original 3D patch. 3D patch 310 can be generated by adding Gaussian noise to the original 3D patch. 3D patch 312 can be generated by applying a histogram shift to values in the original 3D patch.

Returning to the discussion of FIG. 2, in some embodiments, data-generation component 204 performs normalization of training 3D patches 258 that meet class value thresholds 252 before these training 3D patches 258 are used to train 3D segmentation model 228. For example, data-generation component 204 could use min-max normalization to transform values of pixels, voxels, or other 3D points in each of training 3D patches 258 so that these values fall within the range of 0 to 1.

An update component 206 in training engine 122 uses training 3D patches 258 from data-generation component 204 and the corresponding class labels 242 in training data 202 to train 3D segmentation model 228. More specifically, update component 206 inputs training 3D patches 258 that meet class value thresholds 252 into 3D segmentation model 228. For each inputted training 3D patch, update component 206 executes 3D segmentation model 228 to generate a corresponding set of training output 210. This training output 210 includes predictions of classes for individual pixels, voxels, or other 3D locations in the inputted training 3D patch. Update component 206 also computes one or more losses 216 between training output 210 and a set of class labels 242 for the training 3D patch and uses a training technique (e.g., gradient descent and backpropagation) to update model parameters 208 of 3D segmentation model 228 in a way that reduces losses 216.

In one or more embodiments, update component 206 computes losses 216 based on a set of class weights 214 associated with class labels 242 in training data 202. Each of class weights 214 corresponds to a different class in training data 202 and is determined based on the frequency of that class in training 3D images 240. For example, losses 216 could include a weighted cross entropy loss with the following representation:

$$\mathcal{L}_{WCE} = -\beta y \log(\hat{y}) + (1 - y)\log(1 - \hat{y}) \qquad (1)$$

In the above equation, y represents a predicted probability of a given class for a 3D location (e.g., pixel, voxel, 3D point, etc.) in a training 3D image, y is a binary indicator of whether the 3D location is labeled with that class, and B is a class weight associated with that class. The class weight for a given class could be computed by dividing the number of occurrences of the most frequent class in training 3D images 240 (or a given set of training 3D patches 258 extracted from training 3D images) by the number of occurrences of the given class in training 3D images 240 (or the set of training 3D patches 258). Because the class weight for a given class is inversely proportional to the frequency of the class, losses 216 that incorporate class weights 214 can be used to correct for the bias of 3D segmentation model 228 toward classes that occur more frequently in training 3D images 240 (or training 3D patches 258 extracted from training 3D images 240).

During training of 3D segmentation model 228, update component 206 updates class weights 214 based on metrics 212 associated with the performance of 3D segmentation model 228. For example, update component 206 could compute metrics 212 as Dice scores, intersections over unions (IoUs), or other measures of semantic segmentation performance between training output 210 generated by 3D segmentation model 228 from a given set of training 3D patches 258 and a corresponding set of class labels 242. Update component 206 could also track changes to metrics 212 as model parameters 208 of 3D segmentation model 228 are iteratively updated based on losses 216. When update component 206 determines that metrics 212 indicate a plateau or degradation in performance of 3D segmentation model 228, update component 206 could lower some or all class weights 214 (e.g., class weights 214 that are greater than 1) by a fixed amount, a percentage, or another value. Update component 206 could repeat this process until all class weights 214 are equal, one or more class weights 214 reach a minimum value, convergence is reached by model parameters 208 of 3D segmentation model 228, a measured performance or accuracy of 3D segmentation model 228 meets one or more corresponding thresholds or criteria, one or more losses 216 fall below one or more corresponding thresholds, and/or another condition is met.

Update component 206 additionally includes functionality to dynamically vary patch sizes 254 of training 3D patches 258 inputted into 3D segmentation model 228 based on the performance of 3D segmentation model 228. For example, update component 206 could initially train 3D segmentation model 228 using a set of training 3D patches 258 that have a large patch size. As losses 216 are reduced, update component 206 could gradually decrease patch sizes 254 of training 3D patches 258 inputted into 3D segmentation model 228 to refine the performance of 3D segmentation model 228. As training of 3D segmentation model 228 progresses, update component 206 could also generate or select training 3D patches 258 that include objects for which 3D segmentation model 228 previously generated incorrect or "uncertain" (e.g., low confidence) training output 210 as additional training input into 3D segmentation model 228.

In some embodiments, update component 206 performs training of 3D segmentation model 228 using different sequences or combinations of class weights 214, patch sizes 254, and/or other hyperparameters. In these embodiments, update component 206 can use a grid search, random search, particle swarm optimization, Bayesian optimization, gradient-based optimization, early stopping, and/or another type of optimization technique to identify the best sequences or combinations of patch sizes 254 and/or class weights 214 with which to train 3D segmentation model 228. Update component 206 can also, or instead, use the same type of optimization technique and/or a different type of optimization technique to identify specific points in the training of 3D segmentation model 228 at which patch sizes 254 and/or class weights 214 are to be changed. After one or more versions of 3D segmentation model 228 are trained, update component 206 can also use a validation set (not shown) of additional 3D images and corresponding class labels to determine the performance of each version of 3D segmentation model 228. Update component 206 can additionally use the validation set to determine the best-performing version of 3D segmentation model 228 for a given patch size.

After training of 3D segmentation model 228 is complete, execution engine 124 uses the trained 3D segmentation model 228 to perform semantic segmentation of a new 3D image 220. In particular, execution engine 124 extracts one or more sets of 3D patches 222 from 3D image 220. For example, execution engine 124 could divide 3D image 220 into multiple contiguous 3D patches 222 of the same patch size. In another example, execution engine 124 could extract overlapping patches from 3D image 220 based on a stride that is less than a corresponding patch dimension or patch size.

Next, execution engine 124 inputs 3D patches 222 into 3D segmentation model 228 and uses 3D segmentation model 228 to generate patch-level semantic segmentations 230 of the inputted 3D patches 222. For example, execution engine 124 could use 3D segmentation model 228 to generate predictions of classes for individual pixels, voxels, or 3D locations within each of 3D patches 222.

Execution engine 124 also combines patch-level semantic segmentations 230 of 3D patches 222 into an image-level semantic segmentation 232 of 3D image 220. For example, execution engine 124 could use the layout of 3D patches 222 within 3D image 220 to form a corresponding layout of patch-level semantic segmentations 230. Execution engine 124 could also use the layout of patch-level semantic segmentations 230 as a corresponding image-level semantic segmentation 232. Each 3D position in image-level semantic segmentation 232 would include a prediction of a class for the same 3D position in 3D image 220. Alternatively, execution engine 124 can use patch-level semantic segmentations 230 as discrete predictions of object locations within the corresponding regions of 3D image 220 without combining patch-level semantic segmentations 230 into image-level semantic segmentation 232.

In some embodiments, execution engine 124 uses one or more versions of 3D segmentation model 228 to generate multiple sets of patch-level semantic segmentations 230 from multiple sets of 3D patches 222 of different patch sizes (e.g., patch sizes 254), dimensions, or locations within the same 3D image 220. For example, execution engine 124 could divide 3D image 220 into X different sets of 3D patches 222, where each set of 3D patches 222 includes multiple 3D patches 222 of the same patch size and different sets of 3D patches 222 are associated with different patch sizes. Execution engine 124 could also use 3D segmentation model 228 to convert each set of 3D patches 222 into a corresponding set of patch-level semantic segmentations 230. If multiple versions of 3D segmentation model 228 have been trained to generate patch-level semantic segmentations 230 for 3D patches 222 of different sizes, execution engine 124 could use a different version of 3D segmentation model 228 to convert 3D patches 222 of a certain patch size into a corresponding set of patch-level semantic segmentations 230.

Execution engine 124 can further combine different levels or types of detail associated with multiple sets of patch-level semantic segmentations 230 into one or more image-level semantic segmentations for 3D image 220. For example, execution engine 124 could generate image-level semantic segmentation 232 as an average, majority vote, and/or another aggregation of multiple sets of patch-level semantic segmentations 230 (e.g., from multiple strided patches of the same size and/or multiple overlapping patches of different sizes). In another example, execution engine 124 could generate a separate image-level semantic segmentation 232 from each set of patch-level semantic segmentations 230 produced by 3D segmentation model 228 from a corresponding set of 3D patches 222. Each image-level semantic segmentation 232 could capture a different level of detail associated with objects in 3D image 220 and could be used to perform a different task (e.g., edge detection, object detection, etc.) associated with the objects.

While the operation of training engine 122 and execution engine 124 has been described above with respect to semantic segmentation of 3D images using 3D patches, it will be appreciated that training engine 122 and execution engine 124 can be used to train and execute machine learning models for other types of tasks and/or data. For example, the disclosed techniques training engine 122 and execution engine 124 could be used to train and execute machine learning models that process N-dimensional images, volumes, or other types of data (for positive integer values of N) and/or N-dimensional patches that correspond to contiguous regions or subsets of the data. Training engine 122 and execution engine 124 could also, or instead, be used to train and execute machine learning models to perform classification, object detection, semantic segmentation, instance segmentation, image editing, pose estimation, object tracking, or other tasks related to N-dimensional images, volumes, or other types of data (for positive integer values of N).

Figure 4:
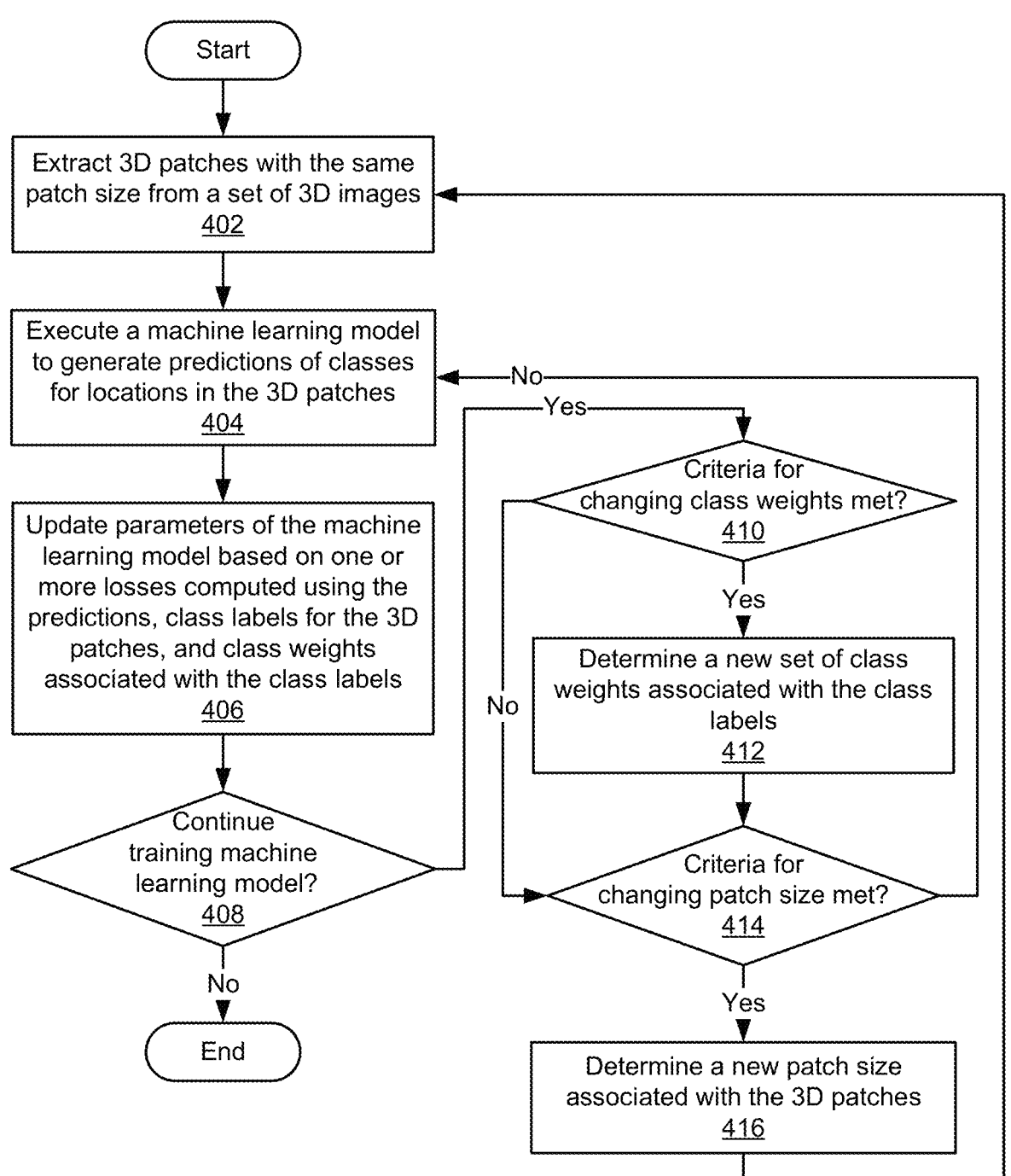
FIG. 4 is a flow diagram of method steps for training a machine learning model to perform semantic segmentation of 3D images, according to various embodiments.

FIG. 4 is a flow diagram of method steps for training a machine learning model to perform semantic segmentation of 3D images, according to various embodiments. Although the method steps are described in conjunction with the systems of FIGS. 1-2, persons skilled in the art will understand that any system configured to perform some or all of the method steps in any order falls within the scope of the present disclosure.

As shown, in step 402, training engine 122 extracts a set of 3D patches with the same patch size from a set of 3D images. For example, training engine 122 could divide each 3D image into contiguous cube-shaped 3D patches and/or extract 3D patches from random locations in the 3D images. Training engine 122 can also verify that each 3D patch includes a minimum number or proportion of class labels for one or more classes of objects. Training engine 122 can additionally apply one or more augmentations to each 3D patch that meets the minimum threshold to generate one or more additional 3D patches.

In step 404, training engine 122 executes the machine learning model to generate predictions of classes for locations in the 3D patches. For example, training engine 122 could input each 3D patch into a U-Net, V-Net, and/or another type of fully convolutional neural network. Training engine 122 could use the fully convolutional neural network to convert each 3D patch into predicted probabilities of classes for individual pixels, voxels, or 3D points in the 3D patch.

In step 406, training engine 122 updates parameters of the machine learning model based on one or more losses computed using the predictions, class labels for the 3D patches, and class weights associated with the class labels. For example, training engine 122 could compute class weights that are inversely proportional to the frequencies of the corresponding classes in the 3D patches or 3D images. Training engine 122 could use the class weights to compute a weighted cross entropy and/or another type of loss between the predictions and class labels. Training engine 122 could then use gradient descent and backpropagation to update weights in the machine learning model in a way that reduces the loss(es).

In step 408, training engine 122 determines whether or not to continue training the machine learning model. For example, training engine 122 could determine that training of the machine learning model is to continue until one or more conditions are met. These condition(s) include (but are not limited to) convergence in the parameters of the machine learning models; the lowering of the loss(es) to below a threshold; or a certain number of training steps, iterations, batches, and/or epochs. Once these condition(s) are met, training engine 122 ends the process of training the machine learning model.

If training of the machine learning model is to continue, training engine 122 proceeds to step 410. In step 410, training engine 122 determines whether or not one or more criteria for changing the class weights is met. For example, training engine 122 could determine that the class weights are to be changed when the machine learning model has been trained for a certain number of training steps, iterations, batches, and/or epochs, or when the loss(es) and/or another metric associated with the performance of the machine learning model meet a threshold or condition.

If the criteria for changing the class weights are met, training engine 122 performs step 412 to determine a new set of class weights associated with the class labels. For example, training engine 122 could lower each class weight that is greater than a certain value (e.g., 1) by a fixed amount, a percentage, or another value. In another example, training engine 122 could raise and/or change each class weight by a predetermined or random value. If the criteria for changing the class weights are not met, training engine 122 omits step 412 and proceeds directly to step 414.

In step 414, training engine 122 determines whether or not one or more criteria for changing the patch size associated with the 3D patches is met. For example, training engine 122 could determine that the patch size of the 3D patches is to be changed when the machine learning model has been trained for a certain number of training steps, iterations, batches, and/or epochs, or when the loss(es) and/or another metric associated with the performance of the machine learning model meet a threshold or condition.

If the criteria for changing the patch size are met, training engine 122 performs step 416 to determine a new patch size associated with the 3D patches. For example, training engine 122 could select the next patch size in a predetermined sequence of decreasing (or increasing) patch sizes, increase or decrease the patch size by a fixed or random amount, or otherwise change the patch size associated with the 3D patches. If step 416 is performed by training engine 122, training engine 122 subsequently performs step 402 to extract 3D patches with the new patch size from the set of 3D images. Training engine 122 then repeats steps 404-408 to further train the machine learning model using the new patch size and the current class weights.

If the criteria for changing the patch size are not met, training engine 122 omits step 416. Training engine 122 also repeats steps 404-408 to further train the machine learning model using the existing patch size and most recent set of class weights.

Consequently, training engine 122 performs steps 402-408 to train the machine learning model over a certain number of training steps, iterations, batches, stages, and/or epochs using 3D patches of a certain patch size and a certain set of class weights. If training of the machine learning model is to proceed after this number of training steps, iterations, batches, stages, and/or epochs, training engine 122 performs steps 410-416 to adjust the patch size and/or class weights based on the corresponding criteria. Training engine 122 then repeats steps 402-408 to perform additional training stages that train the machine learning model using a new or existing patch size and/or a new or existing set of class weights. Training engine 122 ends the process of training the machine learning model once one or more conditions indicating that training of the machine learning model is complete are met.

In sum, the disclosed techniques train and execute a machine learning model to perform semantic segmentation of CryoET tomograms and other types of N-dimensional (where N is a positive integer) images, volumes, or other types of data that include small and sparsely distributed N-dimensional objects of interest. Each image, volume, or unit of N-dimensional data is divided into one or more patches, and each patch is provided as a separate input into a machine learning model. The machine learning model converts each inputted patch into a corresponding semantic segmentation. For the example of CryoET, the machine learning model could generate predictions of classes representing different proteins, membranes, cell structures, particles, or other objects of interest for individual pixels, voxels, or 3D locations in a given 3D patch extracted from a CryoET tomogram volume.

During training, the size of the patches is dynamically varied based on the performance of the machine learning model. For example, the machine learning model could initially be trained using patches of a certain size. As training of the machine learning model progresses, the performance of the machine learning model could be determined using a loss function and/or one or more metrics. When the performance of the machine learning model meets a threshold and/or a set of conditions, the size of the patches is reduced. Consequently, the machine learning model could be trained over X different stages for X different patch sizes (where X is a positive integer greater than 1).

The loss function used to train the machine learning model can also be varied dynamically based on the performance of the machine learning model. More specifically, the loss function includes different weights for different classes of objects with which training data for the machine learning model is labeled. The weights are computed to be inversely proportional to the relative frequencies of the classes in the training data, so that the most frequent class is associated with the lowest weight and the least frequent class is associated with the highest weight. As training of the machine learning model progresses, the weights are gradually adjusted to be closer to one another over time.

One technical advantage of the disclosed techniques relative to the prior art is that, by training and executing the machine learning model using 3D patches extracted from larger 3D images, the disclosed techniques adapt the 3D semantic segmentation task to available memory and computational resources. Another technical advantage of the disclosed techniques is that, by varying the size of the 3D patches and class weights used to train the machine learning model, the disclosed techniques increase the granularity and precision with which the machine learning model recognizes and locates objects in the 3D patches. These technical advantages provide one or more technological improvements over prior art approaches.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for training a machine learning model to perform semantic segmentation of sparse n-dimensional volumes, the method comprising:
   extracting, from a set of n-dimensional images, a first set of n-dimensional patches having a first patch size;
   training the machine learning model using the first set of n-dimensional patches and a first set of losses associated with the first set of n-dimensional patches; and
   upon determining that the first set of losses meets one or more thresholds corresponding to a performance of the machine learning model:
      determining, based on the performance of the machine learning model, a second patch size that is (i) associated with a second set of n-dimensional patches extracted from the set of n-dimensional images and (ii) smaller than the first patch size; and
      training the machine learning model using the second set of n-dimensional patches and a second set of losses associated with the second set of n-dimensional patches.

2. The computer-implemented method of claim 1, further comprising adding, to the second set of n-dimensional patches, one or more patches that include objects associated with a type of training output generated by the machine learning model prior to training the machine learning model using the second set of n-dimensional patches and the second set of losses.

3. The computer-implemented method of claim 2, wherein the type of training output comprises at least one of an incorrect training output or a low confidence training output.

4. The computer-implemented method of claim 1, wherein training the machine learning model comprises:
   computing the first set of losses based on a first set of predictions generated by the machine learning model from the first set of n-dimensional patches and a first set of weights for a set of classes associated with the set of n-dimensional images; and
   computing the second set of losses based on a second set of predictions generated by the machine learning model from the second set of n-dimensional patches and a second set of weights for the set of classes.

5. The computer-implemented method of claim 4, wherein training the machine learning model further comprises determining the first set of weights based on a set of frequencies associated with the set of classes within the set of n-dimensional images.

6. The computer-implemented method of claim 4, wherein training the machine learning model further comprises determining the second set of weights by lowering one or more weights included in the first set of weights.

7. The computer-implemented method of claim 1, wherein extracting the first set of n-dimensional patches comprises:
   selecting a n-dimensional patch from a n-dimensional image included in the set of n-dimensional images;
   determining that a set of class labels associated with the n-dimensional patch meets one or more additional thresholds; and
   in response to determining that the one or more additional thresholds are met, adding the n-dimensional patch to the first set of n-dimensional patches.

8. The computer-implemented method of claim 7, wherein the one or more additional thresholds comprise a proportion of the n-dimensional patch that is associated with the set of class labels.

9. The computer-implemented method of claim 1, wherein at least one of the first set of losses or the second set of losses comprises a weighted cross entropy loss.

10. The computer-implemented method of claim 1, wherein the machine learning model comprises a V-Net architecture.

11. One or more non-transitory computer-readable media storing instructions that, when executed by one or more processors, cause the one or more processors to perform the steps of:
   extracting, from a set of n-dimensional images, a first set of n-dimensional patches having a first patch size;
   during a first training stage, training a machine learning model using the first set of n-dimensional patches and a first set of losses associated with the first set of n-dimensional patches; and
   upon determining that the first set of losses meets one or more thresholds corresponding to a performance of the machine learning model:
      determining, based on the performance of the machine learning model, a second patch size that is (i) associated with a second set of n-dimensional patches extracted from the set of n-dimensional images and (ii) smaller than the first patch size; and during a second training stage following the first training stage, training the machine learning model using the second set of n-dimensional patches and a second set of losses associated with the second set of n-dimensional patches.

12. The one or more non-transitory computer-readable media of claim 11, wherein the instructions further cause the one or more processors to perform the steps of:

applying one or more augmentations to the first set of n-dimensional patches to generate a third set of n-dimensional patches; and training the machine learning model using the third set of n-dimensional patches and the first set of losses.

13. The one or more non-transitory computer-readable media of claim 12, wherein the one or more augmentations comprise at least one of a rotation, a translation, a scaling, a shearing, a histogram shift, an addition of noise, or an elastic deformation.

14. The one or more non-transitory computer-readable media of claim 11, wherein the instructions further cause the one or more processors to perform the steps of:

determining that one or more conditions associated with training the machine learning model using the first set of n-dimensional patches and the first set of losses are met; and in response to determining that the one or more conditions are met, training the machine learning model using the first set of n-dimensional patches and a third set of losses, wherein the first set of losses is computed based on a first set of weights for a set of classes associated with the set of n-dimensional images and the third set of losses is computed based on a second set of weights for the set of classes.

15. The one or more non-transitory computer-readable media of claim 14, wherein the instructions further cause the one or more processors to perform the step of lowering one or more weights included in the first set of weights to generate the second set of weights.

16. The one or more non-transitory computer-readable media of claim 11, wherein training the machine learning model using the first set of n-dimensional patches and the first set of losses comprises:

computing a first set of weights for a set of classes associated with the first set of n-dimensional patches; and computing the first set of losses based on the first set of weights and a first set of predictions generated by the machine learning model from the first set of n-dimensional patches.

17. The one or more non-transitory computer-readable media of claim 16, wherein training the machine learning model using the second set of n-dimensional patches and the second set of losses comprises computing the second set of losses based on the first set of weights and a second set of predictions generated by the machine learning model from the second set of n-dimensional patches.

18. The one or more non-transitory computer-readable media of claim 11, wherein extracting the first set of n-dimensional patches comprises:

selecting an n-dimensional patch from an image included in the set of n-dimensional images;

determining that a set of class labels associated with the n-dimensional patch does not meet a threshold; and in response to determining that the threshold is not met, omitting the n-dimensional patch from the first set of n-dimensional patches.

19. The one or more non-transitory computer-readable media of claim 11, wherein the set of n-dimensional images comprises a set of tomograms.

20. A system, comprising:

one or more memories that store instructions, and one or more processors that are coupled to the one or more memories and, when executing the instructions, are configured to perform the steps of:

extracting, from a set of n-dimensional images, a first set of n-dimensional patches having a first patch size;

training a machine learning model using a first set of losses associated with the first set of n-dimensional patches; and upon determining that the first set of losses meets one or more thresholds corresponding to a performance of the machine learning model:

determining, based on the performance of the machine learning model, a second patch size that is (i) associated with a second set of n-dimensional patches extracted from the set of n-dimensional images and (ii) smaller than the first patch size; and training the machine learning model using the second set of n-dimensional patches and a second set of losses associated with the second set of n-dimensional patches.

21. A computer-implemented method for performing semantic segmentation, the method comprising:

extracting a first set of n-dimensional patches from a n-dimensional image;

executing a trained machine learning model to convert the first set of n-dimensional patches into a set of n-dimensional semantic segmentations, wherein the trained machine learning model is generated by:

training a machine learning model using a second set of n-dimensional patches having a first patch size and a first set of losses;

upon determining that the first set of losses meets one or more thresholds corresponding to a performance of the machine learning model:

determining, based on the performance of the machine learning model, a second patch size that is (i) associated with a third set of n-dimensional patches and (ii) smaller than the first patch size; and training the machine learning model using the third set of n-dimensional patches and a second set of losses; and generating a semantic segmentation of the n-dimensional image based on the set of n-dimensional semantic segmentations.

* * * * *